United States Patent [19]

Felix

[11] 4,214,275
[45] Jul. 22, 1980

[54] APPARATUS AND A PROCESS FOR READING A TARGET OF A CAMERA TUBE

[75] Inventor: Pierre Felix, Paris, France
[73] Assignee: Thomson-CSF, Paris, France
[21] Appl. No.: 939,661
[22] Filed: Sep. 5, 1978
[30] Foreign Application Priority Data
  Sep. 9, 1977 [FR] France ............................... 77 27316
[51] Int. Cl.² ............................................... H04N 5/34
[52] U.S. Cl. ................................................ 358/223
[58] Field of Search ............... 358/217, 221, 223, 113; 250/333

[56] References Cited
U.S. PATENT DOCUMENTS

| | | | |
|---|---|---|---|
| 3,431,460 | 3/1969 | Webb | 358/223 X |
| 3,499,109 | 3/1970 | Kihara et al. | 358/223 |
| 3,683,108 | 8/1972 | Pieters | 358/223 |

Primary Examiner—Robert L. Richardson
Attorney, Agent, or Firm—Roland Plottel

[57] ABSTRACT

An apparatus, and a process, for reading a target of a camera tube. The apparatus includes circuits for scanning the inner surface of the target along a plurality of parallel lines. The scanning being done by an electron beam. Means for stabilizing each line of order n by a stabilizing scan of the electron beam to a value $V_o$. And means for reading the line of order n by a reading scan of an electron beam to a value $V'_o$, after an integration time ti that is adjustable; and $V'_o$ being lower than $V_o$ is absolute value.

10 Claims, 11 Drawing Figures

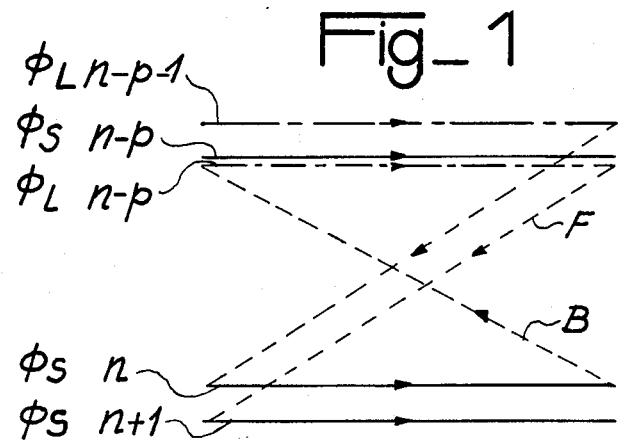
Fig_1
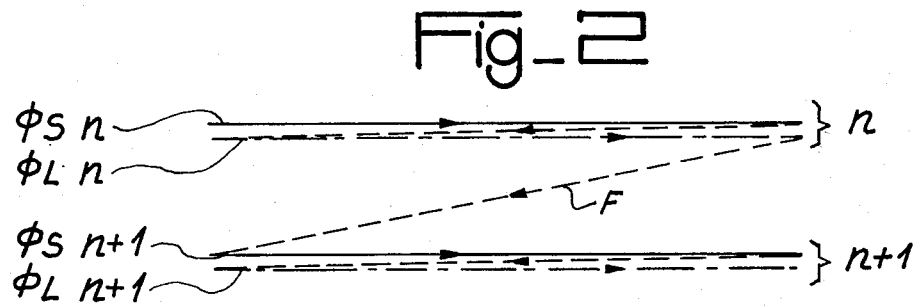
Fig_2
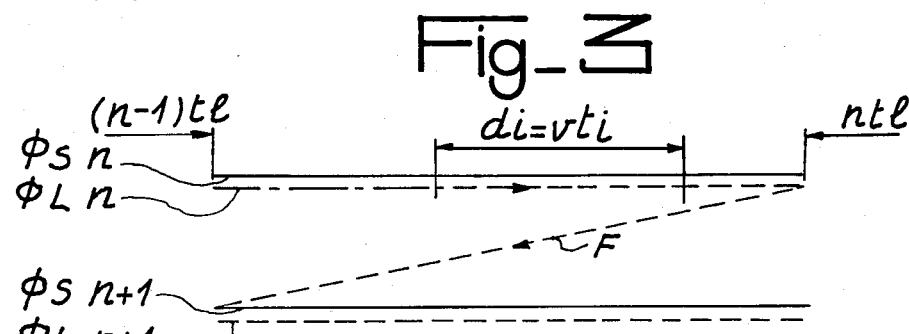
Fig_3
Fig_4

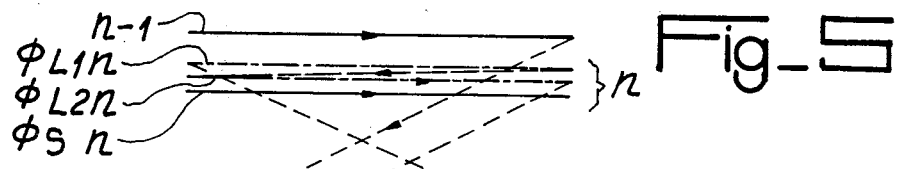
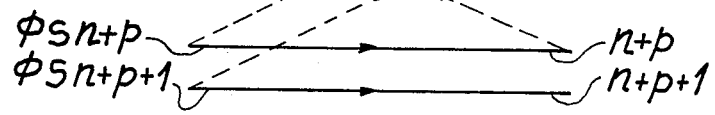
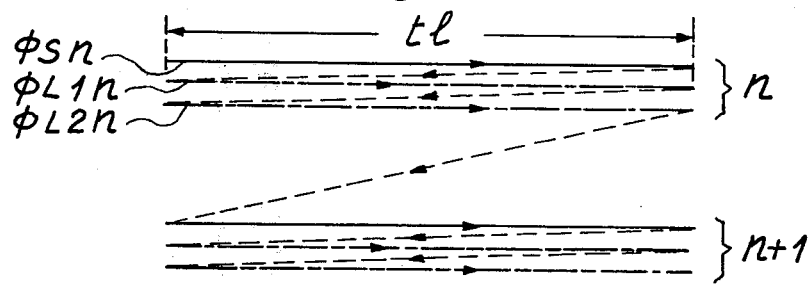
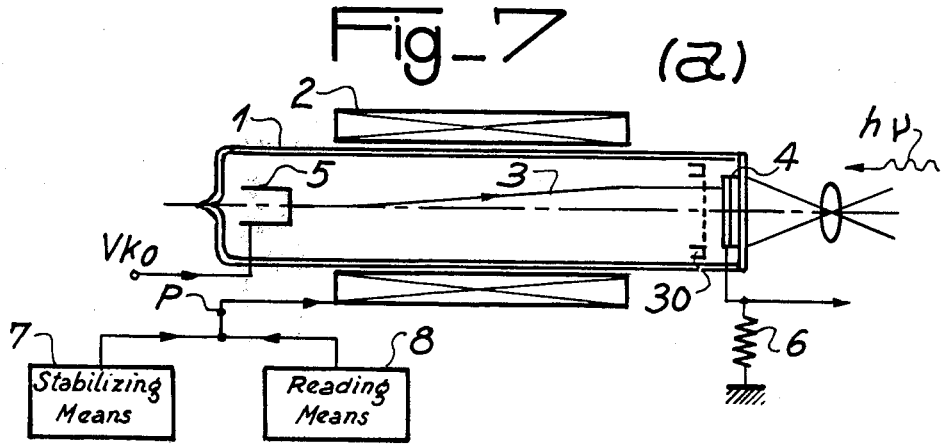
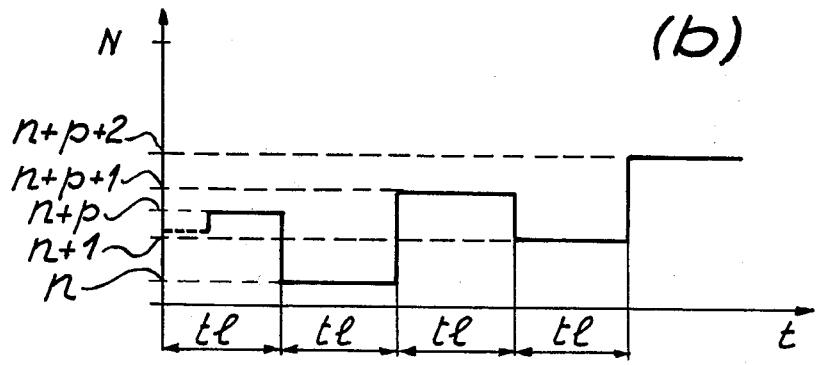

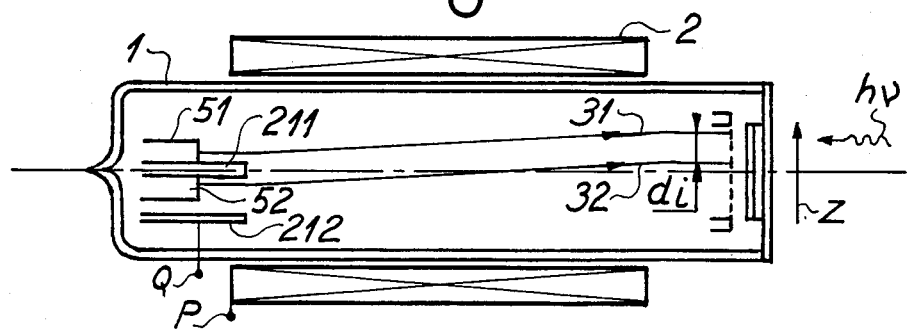
Fig_8
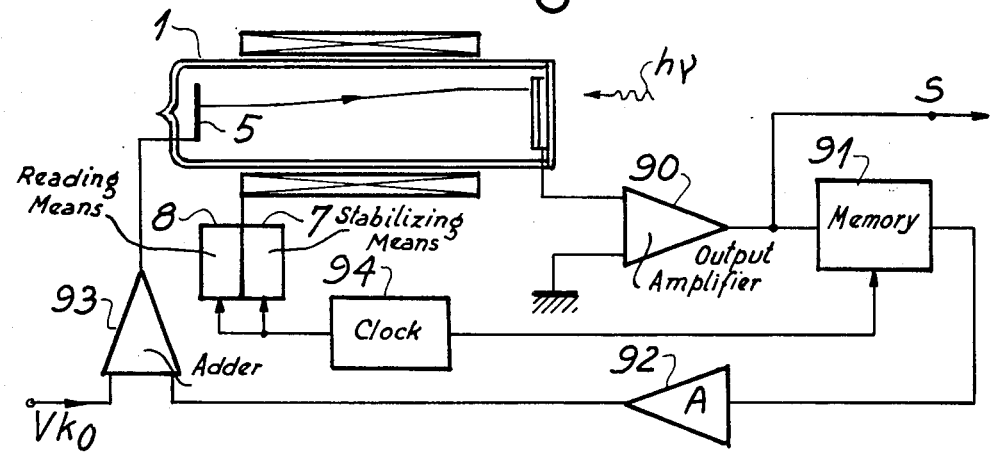
Fig_9
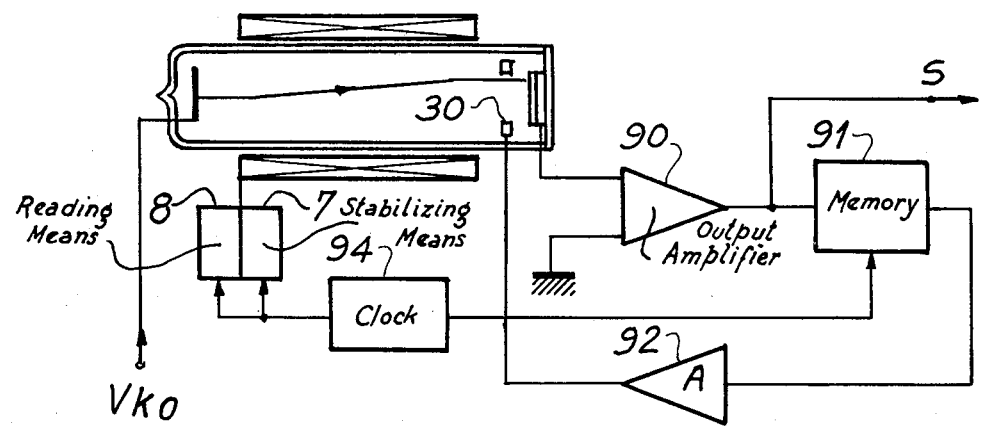
Fig_10

APPARATUS AND A PROCESS FOR READING A TARGET OF A CAMERA TUBE

This invention relates to an apparatus and a process for reading a detecting target situated in a camera tube, such as a television camera tube for example.

Conventional camera tubes comprise targets of which the detecting elements are rapidly saturated. These detecting elements are saturated in a time shorter than the field scanning time either by an overintense darkness current or by an overintense incident electromagnetic radiation. Saturation by an intense darkness current is particularly encountered when the semiconductor material forming the target is a semiconductor material having a mean or narrow forbidden band width. These semiconductor materials are, in the order of decreasing forbidden band, germanium Ge, lead sulphide PbS, indium arsenide InAs, lead selenide PbSe, indium antimonide InSb, lead telluride PbTe, mixed lead/tin telluride Pb(1-x) SnxTe, mixed mercury/cadmium telluride Hg (1-x) CdxTe. In this case, the darkness current emanates from the intense generation of heat which, however, may be reduced by cooling. Saturation by intense radiation is encountered in particular in infrared detection by photon detectors when the constituent material of the detectors is also formed by a semiconductor material having a narrow forbidden band for radiation having a wavelength of greater than 2 micrometers. In this case, the useful radiation is composed of a low modulation superimposed upon an intense continuous base radiation which causes saturation.

The reading apparatus and process according to the invention enable the disadvantages referred to above to be obviated by an adjustable integration time enabling saturation to be avoided.

The present invention relates to an apparatus and a process for reading a target of a television camera tube with adjustable integration time by scanning the inner surface of the target in a plurality of parallel lines by an electron beam, the reading of each line of order n of the target successively comprising a stabilization phase along the line of order n for the potentials developed during an irradiation on the inner surface of the target in relation to its outer surface, the stabilization phase being effected by a scan along this line of order n by an electron beam which stabilizes the potentials of this line to a value Vo in relation to said outer surface, the stabilization phase being followed by the actual reading phase of the line of order n after a predetermined delay ti corresponding to the integration time of the target adjustable from $t_i = k \cdot t_1$ to $t_i = p \cdot t_1$, where k represents a mixed number smaller than 1, p represents an integer greater than or equal to 1, and where $t_1$ represents the scanning time of the line of order n, the reading phase being effected by a scan of the inner surface of the target along the line of order n by an electron beam which stabilizes the potentials of this inner surface to a value V'o in relation to the outer surface and the stabilization of the potentials to the value V'o generating a current representative of the video-frequency image signal.

The invention is applicable in particular to targets of the detecting type, such as photoconductive targets, mosaics of photodiodes with PN-junctions or metal-semiconductor junctions and mosaics of detectors with metal-insulator-semiconductor junctions known in the field in question as MIS-detectors.

The invention will be better understood from the following description in conjunction with the accompanying drawings where the same references denote the same elements and wherein:

FIG. 1 is a diagram of the phases of the target reading process according to the invention.

FIGS. 2 and 3 each illustrate one particular embodiment of the reading process shown in FIG. 1.

FIG. 4 is a section through the structure of a detector of the type comprising a metal-insulator-semiconductor junction (MIS-detector).

FIG. 5 is a particular diagram of the phases of the target reading process when the target is formed by a MIS-detector of the type shown in FIG. 4.

FIG. 6 is another particular diagram of the phases of the target reading process in the case of a very short integration time.

FIGS. 7a and 7b respectively illustrate an apparatus for reading a camera target with adjustable integration time and the control signals applied to the scanning circuits of the tube.

FIG. 8 shows one particular embodiment of the apparatus according to the invention.

FIGS. 9 and 10 each illustrate one preferred embodiment of the apparatus according to the invention.

According to FIG. 1, the process for reading a target of a television camera tube with adjustable integration time by scanning the inner surface of the target in a plurality of parallel lines by an electron beam successively comprises, for the reading of each line of order n, a stabilization phase along the line of order n for the potentials developed on the inner surface of the target during an irradiation. The stabilization phase of each line of order n is effected by a stabilization scan by an electron beam. The stabilization phase of the line of order n is shown as a continuous line in FIG. 1 and is denoted $\phi_{Sn}$, the arrow indicating the scanning direction. At the end of the stabilization phase of each line of order n, the target potential is stabilised to a reference potential Vo. Thus, each line of order n and, in particular, any line of order n-p in relation to any line of order n is subjected to a stabilization phase such as this, the potential of each line being fixed after this phase to the above-mentioned value Vo. At the end of the stabilization phase $\phi_{Sn}$ of each line of order n, each line of order n-p is subjected to the actual reading phase by scanning by the electron beam. Thus, each line of order n, or n-p, is subjected to the actual reading phase after a predetermined delay ti corresponding to the adjustable integration time of the target. In FIG. 1, the integration time ti equals $t_i = p \cdot t$, where p represents an integer greater than or equal to 1 and where $t_1$ represents the scanning time of the line of order n. During the reading phase, the potential of the inner surface of the target along each line of order n is fixed to a value V'o in relation to the outer surface, the stabilization of potential to the value V'o generating a current representative of the video-frequency image signal. According to FIG. 1, for example, after the stabilization phase $\phi_{Sn}$ of the line of order n, the electron beam flies back by p lines, the retrace path of the beam being shown in dotted lines along the path B. At the end of the reading phase shown in dash-dot lines in FIG. 1 and denoted $\phi L$ n-p for each line of order n-p, the electron beam is shifted by p+1 lines along the path F shown in dotted lines to commence a new stabilization phase $\phi_{Sn+1}$ of the line of order n+1 and so on. The paths F and B of the beam shown in dotted lines are preferably followed at a substantially zero cathode current.

The stabilization of the potentials of the inner surface of the target to the values Vo and V'o during the stabilization and reading phases may be effected by a slow-electron scan. In this case, the inner surface of the target is stabilised to the cathode potential. The potentials may also be stabilised by a fast-electron scan. In this case, the inner surface of the target is stabilized to the potential of the collecting grid of the tube situated directly opposite this surface.

It is of advantage to select $|V'o| < |Vo|$ so as to read in the reading phase a charge proportional to the radiation received during the integration time, ti=ptl, reduced by a constant quantity proportional to $|Vo-V'o|$. This operation is equivalent to clipping the bottom of the videofrequency signal which is particularly useful in the case of infrared detection where the component attributable to the continuous base is very intense. In the scanning configuration shown in FIG. 1, the minimum integration time is 3 tl.

In the same way, the integration time ti of the target in a variant of FIG. 1 shown in FIG. 2 is taken equal to a line scanning time ti=tl. After scanning a line n corresponding to the stabilization phase $\phi_{Sn}$, the beam flies back and scans the same line n with a delay tl during the reading phase $\phi Ln$. The beam then returns into position for the stabilization phase $\phi_{Sn+1}$ of the following line n+1.

In another particular variant of the reading process according to the invention, the adjustable integration time ti is very short and less than the line scanning duration tl. The stabilization phase of a line of order n is followed by the actual reading phase with a delay ti=k tl, k being an integer smaller than 1. In the reading process as illustrated in FIG. 3, the stabilizing electron beam is thus followed during the scans of the lines of order n by a second reading beam at a distance di=vti where v is the scanning speed of the beams on the detecting target and ti is the integration time. In this case, the target current of the stabilizing beam is equal to a constant which is added to the target current of the reading beam. This variant of the reading process is applicable to any type of detecting target and, in particular, to detecting targets of which the semiconductor materials have very short integration times.

In the case of targets formed by a mosaic of MIS-detectors, the actual reading phase of the detecting target is divided into two elementary reading phases. FIG. 4 shows as a reminder a section through a detector of the MIS-type. The detector generally comprises a metallic base 41 corresponding to the metallic plate of the target on which is disposed a substrate 42 of semiconductor material, for example of N-type. The substrate of semiconductor material is covered by a layer 43 of insulating material, such as alumina $Al_2O_3$ or silica $SiO_2$. An electrode 44 or grid of the detector forms with the substrate the MIS-detector. The first elementary reading phase is initiated after the integration time ti. The grid of the MIS-detector is brought to a reference potential Vo in relation to the substrate after the integration time ti during which the grid of the MIS-element is insulated. The grid of the MIS-detector is brought to the potential of the cathode of the tube by the electron beam, the cathode of the tube being brought for example to a negative potential of the order of $-10$ V in relation to the metallic base and to the substrate, creating a space charge zone 420 in the substrate at the level of the grid.

The second elementary reading phase is an injection phase during which the videofrequency signal is opposite, except for a constant, to the videofrequency signal generated by the first elementary reading phase. This is because, during the first elementary reading phase, the charges appearing in the substrate are minority carrier charges due to the radiation. The quantity of charge is proportional to the illumination of the detecting element due to the radiation represented by the arrow h $\nu$. The presence of the insulating layer prevents these charges from flowing. During the second elementary reading phase or injection phase, the charges are recombined in the substrate 42 due to the fact that the space charge zone 420 is returned to its initial state by switching of the grid potential of the MIS-detector to the potential of the cathode by means of the electron beam. In an external charge (not shown in FIG. 4), this phase gives rise to a videofrequency current proportional to the illumination except for the sign.

The sequence of the electron-beam scans corresponding to the first elementary reading phase and to the second elementary reading phase is shown in FIG. 5 where, for the line of order n, the dash-dot lines denoted $\phi L1n$ $\phi L2n$, which are slightly staggered to enable the drawing to be better understood, respectively represent the first elementary reading phase initiated after the integration time ti after the stabilization phase $\phi Sn$ of the line of order n and the second elementary reading phase $\phi L2n$ corresponding to the injection phase.

The second elementary reading phase $\phi L2n$ preferably follows the first elementary reading phase $\phi L1n$ after a time tl equal to a line scanning time tl. In this scanning configuration, the minimum integration time is ti=4 tl.

A variant of this scanning configuration is illustrated in FIG. 6 and allows an integration time ti=tl. The scans corresponding to the stabilization phase, to the first elementary reading phase and to the second elementary reading phase are successively effected on a line of order n with a time stagger of tl. At the end of the three phases, the beam returns into position for the following line of order n+1.

In FIG. 7a, the apparatus for reading the target of a television camera tube with adjustable integration time comprises, at the level of a camera tube 1, circuits 2 for scanning the inner surface of the target 4 by an electron beam. The tube comprises a grid 30. The electron beam denoted by the reference 3 is emitted by an electron gun 5 and the beam scans the inner surface of the target 4 along a plurality of parallel lines in a scan of the television type for example. The outer surface of the target 4 is formed by a metallic plate. The outer surface of the target is transparent to the incident radiation symbolised by the arrow denoted h $\nu$. The metallic plate of the target is electrically connected to an external charge 6 where the videofrequency image signal is extracted. The apparatus according to the invention comprises means 7 for stabilising along each line of order n the potentials developed on the inner surface of the target 4 during an irradiation. The stabilising means 7 are connected to the scanning circuits 2 and deliver a signal which causes a first scan of each line of order n by the electron beam. The first scan by the electron beam fixes the potentials of the inner surface of the target at a value Vo in relation to the irradiated outer surface. The apparatus additionally comprises means 8 for actually reading each line of order n. The actual reading means 8 are connected to the scanning circuit 2 and deliver a signal which causes a second scan of each line of order n by the same electron beam, which then successively assumes the stabilization and the reading phase of each line of order n, after a predetermined delay ti=p·t₁ in relation to the first scan, p representing an integer greater than or equal to 1 and t₁ representing the scanning time of the line of order n, this delay ti is then corresponding to the adjustable integration time of the target. The reading means 8 stabilize the potentials of the inner surface of the target to a value V'o in relation to the irradiated outer surface. The signals delivered by the stabilizing means 7 and reading means 8 to the point P in FIG. 7a are shown in FIG. 7b.

The ordinate axis of the graph shown in FIG. 7b is graduated in ranks from O to N of the scanning lines of the surface of the target, each rank of order n, n+1 .. . corresponding at the point P to a signal of given level which causes scanning by the beam of the line of order in question.

The sequence of the control signals at the point P is renewed when the line of order N, the last field line of the target, has been read.

According to FIG. 8, the stabilizing 7 and reading means 8 comprise two electron guns 51 and 52 respectively enabling a stabilizing electron beam 31 and a reading electron beam 32 to be generated. The reading beam 32 follows the stabilizing beam 31, on the same line of order n, at a distance di according to the scanning direction represented by the arrow Z such that di=v ti where v is the scanning speed of the beams on the target. In this case, the scanning circuits 2 and the electron guns 51 and 52 comprise a set of additional electrodes 211, 212 which separate the two electron beams and to which is applied, at the point Q, a voltage enabling the distance di separating the two beams 31 and 32 and the integration time of the target ti=k·t₁ where k represents a mixed number smaller than 1, to be adjusted. The electrode 211 separates the two beams and is electrically connected to the potential of the cathodes of the electron guns 51 and 52, whilst the electrode 212 is connected to the point Q and forms a deflection plate for the beam 32. The beam 32 may be continuously adjusted between O and t1, for example by applying an adjustable d.c. voltage to the point Q. The control signals applied to the point P are the standard scanning signals.

As mentioned above, the current of the videofrequency signal may be reduced by a constant quantity by fixing the cathode/signal plate potential difference (the signal plate being formed by the metallic base) during the actual reading phase to a value V'o different from the polarisation Vo in the stabilization phase, the reduction in the videofrequency signal current being proportional to $|Vo-V'o|$. In one preferred embodiment of the invention which is illustrated in FIG. 9, the apparatus comprises a circuit for reducing the videofrequency signal current, this current being released from each detector when the target is formed by a mosaic of detectors. The current is reduced by a quantity associated with a characteristic of the detectors. The circuit for reducing the videofrequency signal current comprises a memory 91 connected to the output amplifier 90 for the videofrequency signal. The videofrequency signal is delivered by the terminal S. The memory is formed for example by a charge transfer register or by any memory device which enables reading to be carried out synchronously with the line scan of the detecting target. The memory comprises an output connected to an amplifier 92. The output of the amplifier is itself connected to the cathode of the electron gun 5 of the camera tube 1 by an adder 93 which, at a second input, receives the initial biassing voltage VKo of the cathode of the tube.

The apparatus comprises a clock 94 which delivers synchronising pulses to the memory for reading the memory and to the stabilizing and reading circuits 7,8.

The apparatus illustrated in FIG. 9 operates as follows:

The characteristic relating to the charge of a detector for a given radiation intensity is memorised for each detector. These characteristics extracted at the frequency of the line scan of the target by a synchronous reading of the memory are applied to the cathode in the form of voltage variations in phase with the reading of the detectors. For reading a given detector, a voltage associated with the characteristic of this detector is applied to the cathode. The response signal Si, j of each detector for a reference irradiation H is memorised. The memorised characteristic of each detector may thus be the response of this detector to a reference irradiation or to a reference black-body temperature such as, for example, the mean temperature of the scene to be displayed. When the beam reads the detector for the coordinates i, j, the signal Si, j is extracted from the memory, amplified by the amplifier 92 so that the cathode potential is VKo+ASi, j when the gain of the amplifier 92 is equal to A, VKo being a constant biassing voltage of the cathode. The gain A of the amplifier 92 is selected in such a way that the videofrequency signal current is proportional, except for an additive constant, to Si, j1−Si, j, where Si, j1 denotes the response signal of the detector i,j to the irradiation H1 of the scene to be displayed.

A correction such as this partly redresses the dispersion-of-characteristic error of the detectors. In particular, the minimal deviation ΔH of detectable irradiation intensity, limited by the response dispersion ΔR of the detectors, from the mean value R is given by ΔH=ΔR/R (H1−H). This deviation is smaller, the smaller the deviation H1−H. H may be in particular the mean irradiation intensity of the scene to be displayed. In this case, H is given by a detector which delivers a signal proportional in level to the radiation intensity.

An embodiment such as this is particularly useful for detection in the infrared range where a well known disadvantage of photon detectors is attributable to the dispersion of characteristics of the detectors of one and the same mosaic.

In a variant of the above-described apparatus shown in FIG. 10, the output of the amplifier 92 is directly connected to the grid 30 of the tube in the case where the electron beam is an electron beam for which the coefficient δ of secondary emission at the level of the grid 30 is greater than 1. δ>1.

In addition, this treatment of the signal by the apparatus described above is more complete than clipping off the base by subtraction from a constant signal and enables the signal to be integrated over a longer period and, hence, provides for an improvement in the signal-to-noise ratio.

I claim:

1. A process for reading a target of a television camera tube with adjustable integration time by scanning the inner surface of the target in a plurality of parallel lines by an electron beam, wherein the reading of each line of order n successively comprises:

a stabilization phase along the line of order n of the potentials developed during an irradiation on the inner surface of the target in relation to its outer surface, said stabilization phase being effected by a scan along this line of order n by an electron beam which stabilizes the potentials along the line in question to a value Vo in relation to said outer surface, said stabilization phase being followed by:

the actual reading phase of the line of order n after a predetermined delay ti corresponding to the integration time ti of the target adjustable from $ti=k \cdot t_1$ to $ti=p \cdot t_1$, where k represents a mixed number smaller than 1, p represents an integer greater than or equal to 1, and where $t_1$ represents the scanning time of the line of order n, said reading phase being effected by scanning of the inner surface of the target along the line of order n by an electron beam which stabilizes the potentials of the inner surface of the target to a value V'o in relation to the outer surface of the target, stabilization of the potentials to the value V'o generating a current representative of the video frequency image signal, wherein the stabilization potentials Vo and V'o of the inner surface of the target along the line of order n during the stabilization phase and during the actual reading phase have different values, the potential V'o being lower than Vo in absolute value, $|V'o|<|Vo|$, the video-frequency reading signal corresponding to a charge proportional to the radiation received during irradiation of the target over the integration time ti being reduced by a quantity proportional to $|Vo-V'o|$.

2. A process as claimed in claim 1, wherein the integration time ti of the target being equal to $ti=k \cdot t_1$, a first electron beam realizes the stabilization phase of the line of order n, a second electron beam, realizing the actual reading phase of this line, following the first one, from which it is separated by a distance $di=v \cdot ti$, where v represents the scanning speed of the beams on the detecting target.

3. A process as claimed in claim 1, wherein the integration time being equal to $ti=p \cdot t_1$, the same electron beam successively realizes the stabilization and reading phases of the line of order n.

4. A process as claimed in claim 1, wherein, in the case of detecting targets of the MIS-type, the actual reading phase is divided into two elementary reading phases, a first elementary reading phase being initiated after the adjustable integration time ti and a second elementary reading phase during which the videofrequency signal is opposite, except for a constant, to the videofrequency signal generated during the first elementary reading phase, each elementary reading phase being effected along the line in question by an electron beam scan.

5. An apparatus for reading a target of a television camera tube with adjustable integration time comprising:

circuits for scanning the inner surface of the target along a plurality of parallel lines by an electron beam;

means for stabilizing along each line of order n the potentials developed during an irradiation on the inner surface of the target by a stabilizing scan by electron beam which fixes the potentials of the inner surface of the target to a value Vo in relation to the irradiated outer surface;

means for actually reading the line of order n by a reading scan by electron beam after a predetermined delay ti in relation to the stabilizing scan, said delay corresponding to the integration time $t_1$ of the target adjustable from $ti=k \cdot t_1$ to $ti=p \cdot t_1$, where k represents a mixed number smaller than 1, p represents an integer greater than or equal to 1, and where $t_1$ represents the scanning time of the line of order n, said reading means fixing the potentials of the inner surface of the target at a value V'o in relation to the potential of the irradiated outer surface $V'_o$ being lower than $V_o$ in absolute value, $|V'_o|<|V_o|$, the video-frequency reading signal corresponding to a charge proportional to the radiation received during irradiation of the target over the integration time $t_i$ being reduced by a quantity proportional to $|V_o-V'_o|$.

6. An apparatus as claimed in claim 5, wherein, for each line of order n, the stabilizing means and the reading means successively deliver a signal which causes a first scan and a second scan by the same electron beam after a delay $ti=p \cdot t_1$ corresponding to the integration time of the target.

7. An apparatus as claimed in claim 5, wherein said means for stabilizing, along each line of order n, the potentials developed on the inner surface of the target and said actual reading means comprise two electron guns, enabling two electron beams to be generated, these beams simultaneously realizing the stabilization and the reading of the same line of order n, said reading beam following the stabilizing beam in the scanning direction at a distance di such that $di=vti$ where v is the scanning speed of the beams on the target, the delay $ti=k \cdot t_1$ corresponding to the integration time of the target.

8. An apparatus as claimed in claim 7, wherein the two electron guns comprise a set of additional electrodes, one of these electrodes separating the two beams and being electrically connected to the electron guns and the other electrode forming a deflection plate for the reading beam.

9. An apparatus as claimed in claim 5, an electron beam being produced by the cathode of an electron gun, said apparatus comprising a circuit for reducing the videofrequency signal current, said circuit comprising:

an output amplifier for the videofrequency signal;

a memory connected to the output of the output amplifier;

an amplifier, connected to the output of the memory, the output of the amplifier being connected to the cathode of the electron gun;

a control clock connected on the one hand to the memory and to the means for stabilizing and for reading.

10. An apparatus as claimed in claim 9, wherein the memory is formed by a charge transfer device.

* * * * *